US012689069B2

(12) United States Patent
Beugnon et al.

(10) Patent No.: US 12,689,069 B2
(45) Date of Patent: Jul. 21, 2026

(54) ELECTROCHEMICAL ELEMENT FOR A BATTERY AND CORRESPONDING BATTERY

(71) Applicant: SAFT, Levallois Perret (FR)

(72) Inventors: Alexandre Beugnon, Le Pian Medoc (FR); Alexandre Narbonne, Blanquefort (FR); Gérard Rigobert, Fargues St Hilaire (FR); Nicolas Schiffano, Talence (FR); Paulin Truche, Bruges (FR); Christian Vezat, Saint Jean d'Illac (FR)

(73) Assignee: SAFT, Levallois Perret (FR)

( * ) Notice: Subject to any disclaimer, the term of this patent is extended or adjusted under 35 U.S.C. 154(b) by 711 days.

(21) Appl. No.: 17/917,127

(22) PCT Filed: Apr. 7, 2021

(86) PCT No.: PCT/EP2021/059006
§ 371 (c)(1),
(2) Date: Oct. 5, 2022

(87) PCT Pub. No.: WO2021/204842
PCT Pub. Date: Oct. 14, 2021

(65) Prior Publication Data
US 2023/0155187 A1 May 18, 2023

(30) Foreign Application Priority Data
Apr. 7, 2020 (FR) ..................................... 20 03461

(51) Int. Cl.
*H01M 10/42* (2006.01)
*H01M 4/02* (2006.01)
(Continued)

(52) U.S. Cl.
CPC ..... *H01M 10/4285* (2013.01); *H01M 50/119* (2021.01); *H01M 50/1243* (2021.01);
(Continued)

(58) Field of Classification Search
CPC ........... H01M 10/4285; H01M 50/559; H01M 50/119; H01M 50/1243; H01M 50/169; H01M 2004/026
See application file for complete search history.

(56) References Cited

U.S. PATENT DOCUMENTS 6,159,253 A 12/2000 Lund
2004/0166406 A1* 8/2004 Higuchi .............. H01M 50/169
429/171
(Continued)

FOREIGN PATENT DOCUMENTS

CN 106848378 A 6/2017
EP 0 924 779 A1 6/1999
(Continued)

OTHER PUBLICATIONS

Rapport De Recherche Préliminaire issued in French Patent Application No. 2003461 dated Nov. 27, 2020.
(Continued)

*Primary Examiner* — Nicole M. Buie-Hatcher
*Assistant Examiner* — Taylor Harrison Krone
(74) *Attorney, Agent, or Firm* — Troutman Pepper Locke LLP

(57) ABSTRACT

This electrochemical element for a battery, comprising a first electrode of a first polarity, a first terminal of the first polarity, a second electrode of a second polarity, a second terminal of the second polarity, and a casing comprising a first wall and a second wall. The first wall and the second wall each comprise a base body of metal and an electrically insulating layer. The electrically insulating layer comprises either a plastic coating or a layer resulting from a surface treatment. Each of the base bodies comprises a base body edge. The edges of the base bodies are joined by a weld bead to form the casing. At the location of the weld bead, the base bodies are free of the electrically insulating layer.

5 Claims, 7 Drawing Sheets

(51) Int. Cl.
    *H01M 50/119*     (2021.01)
    *H01M 50/124*     (2021.01)
    *H01M 50/169*     (2021.01)
    *H01M 50/559*     (2021.01)

(52) U.S. Cl.
    CPC ....... *H01M 50/169* (2021.01); *H01M 50/559*
    (2021.01); *H01M 2004/026* (2013.01)

(56)           References Cited

U.S. PATENT DOCUMENTS

| | | | |
|---|---|---|---|
| 2006/0099504 | A1 | 5/2006 | Kim |
| 2011/0244286 | A1* | 10/2011 | Fuhr .................. H01M 50/124 |
| | | | 29/623.5 |
| 2014/0302379 | A1* | 10/2014 | Nam .................. H01M 50/567 |
| | | | 429/158 |
| 2015/0030912 | A1 | 1/2015 | Nose et al. |

| | | | |
|---|---|---|---|
| 2017/0040575 | A1* | 2/2017 | Bang .................. H01M 50/184 |
| 2018/0190960 | A1* | 7/2018 | Harris .................. H01M 50/20 |
| 2018/0309093 | A1* | 10/2018 | Amatucci ............ H01M 50/119 |
| 2020/0358048 | A1* | 11/2020 | Kim ........................ C25D 11/04 |

FOREIGN PATENT DOCUMENTS

| | | |
|---|---|---|
| EP | 1453119 A1 | 9/2004 |
| EP | 1 742 279 A2 | 1/2007 |
| EP | 2 040 322 A2 | 3/2009 |
| JP | 2000-223090 A | 8/2000 |
| JP | 2004-95217 A | 3/2004 |

OTHER PUBLICATIONS

Interational Search Report issued in International Patent Application No. PCT/EP2021/059006 dated May 10, 2021, with English translation.

* cited by examiner

ELECTROCHEMICAL ELEMENT FOR A BATTERY AND CORRESPONDING BATTERY

CROSS REFERENCE TO RELATED APPLICATIONS

The present application is a U.S. National Phase Application under 35 U.S.C. § 371 of International Patent Application No. PCT/EP2021/059006 filed Apr. 7, 2021, which claims priority of French Patent Application No. 20 03461 filed Apr. 7, 2020. The entire contents of which are hereby incorporated by reference.

FIELD OF THE INVENTION

The present invention relates to an electrochemical element for a battery, comprising
a first electrode of a first polarity,
a first terminal of the first polarity,
a second electrode of a second polarity,
a second terminal of the second polarity,
a casing comprising a first wall and a second wall.

BACKGROUND

Batteries containing electrochemical cells are known. Such a battery is known from U.S. Pat. No. 6,159,253B1.

The battery in this paper comprises a steel case, an insulation coating and an electrochemical cell. The electrochemical cell comprises an anode assembly and a cathode assembly. The anode and cathode assemblies are stacked and wound.

Another battery is known from EP1742279 which comprises an electrochemical cell having a wound structure.

EP1453119 describes an electrochemical cell comprising a casing having an aluminium support layer bonded to a plastic outer protective layer and a thermoplastic inner layer. The materials that make up the casing are adapted to the required flexibility of the battery.

SUMMARY

The invention aims to provide an electrochemical cell and a corresponding battery that have high reliability and low volume for a given energy storage capacity.

The invention differs from known multi-layer pouch-type elements in that the casing does not have a thermoplastic layer on the inside at the welding points, which allows the walls of the casing to be laser-welded. Thus, a good hermetic seal of the electrochemical cell is ensured by a high reliability of the connection. In addition, to ensure continuity of this hermetic seal and insulation at the current outputs (terminals), the cell has suitable output elements.

In addition, the battery and the electrochemical cell according to the invention must be economical to manufacture, reliable and have a relatively low weight.

For this purpose, the invention relates to an electrochemical cell as indicated above, characterised in that the first wall and the second wall each comprise a base body and an electrically insulating layer, in that
the base bodies are made of metal, in that
the electrically insulating layer comprises
either a plastic coating,
or a layer resulting from a surface treatment, in that
each of the base bodies comprises a base body edge, in that the edges of the base bodies are connected by a weld bead to form the casing, and in that
at the location of the weld bead, the base bodies are free of the electrically insulating layer.

In particular embodiments of the electrochemical cell, it may comprise one or more of the following optional features:
the metal base bodies are made of aluminium or an aluminium-based alloy, or steel, preferably stainless steel or nickel-plated,
the base bodies have a thickness of between 80 μm and 500 μm, in particular between 120 μm and 460 μm, and especially between 180 μm and 460 μm
the casing comprises at least one opening for the passage of the first and/or second terminal,
the first and/or second terminal extends through the passage opening,
the electrochemical cell comprises means for electrically insulating the first and/or second terminal from the casing,
the electrical insulation means comprise
a plastic electrical insulating element extending between the terminal and the casing, and
electrically insulating spacer elements, adapted to separate the terminal from the casing when the plastic material is in a liquid state,
the spacer elements comprise microballs of a material having a melting temperature above the melting temperature of the plastic material and the microballs having a diameter between 50 μm and 500 μm, preferably between 100 μm and 200 μm,
the microballs are embedded in the solidified molten plastic of the electrical insulating element,
the first and/or second terminal is a tab and the casing passage opening is formed
either by two edges of the first and second walls of the casing diverging from each other,
or through an opening in one of the first and second walls of the casing,
the second terminal is a button, namely a washer,
the button either passing through only one of the first and second walls of the casing or passing through both the first and second walls of the casing,
the button comprises a circumferential groove, wherein the casing extends into the circumferential groove, and wherein the electrical insulation means comprises an insulation ring,
the second electrode comprises two electrode sheets and wherein either the second terminal is attached between the two electrode sheets or the second terminal is attached to one of the two electrode sheets and the other of the two electrode sheets is attached to one of the two electrode sheets.

The invention also relates to a battery, comprising a casing and at least two electrochemical cells, characterised in that the electrochemical cells are each an electrochemical cell as defined above, and in that the electrochemical cells are arranged in the casing.

BRIEF DESCRIPTION OF THE DRAWINGS

The invention will be better understood upon reading the following description, given only as an example, and with reference to the attached drawings, in which.

DETAILED DESCRIPTION

In the following, unless otherwise stated, the terms "insulation", "insulating" and its derivatives refer to electrical insulation.

In the description of the various embodiments, similar elements have the same references. Also, unless otherwise stated, each feature described with reference to one embodiment of the invention or to a variant of an embodiment is applicable in isolation or in any possible technical combination to the other embodiments or variants.

The following description contains technical features of the invention. These technical features, although presented in a technical context and possibly in combination with other technical features, may be used individually without the other technical features, provided this is technically possible.

Figure 1:
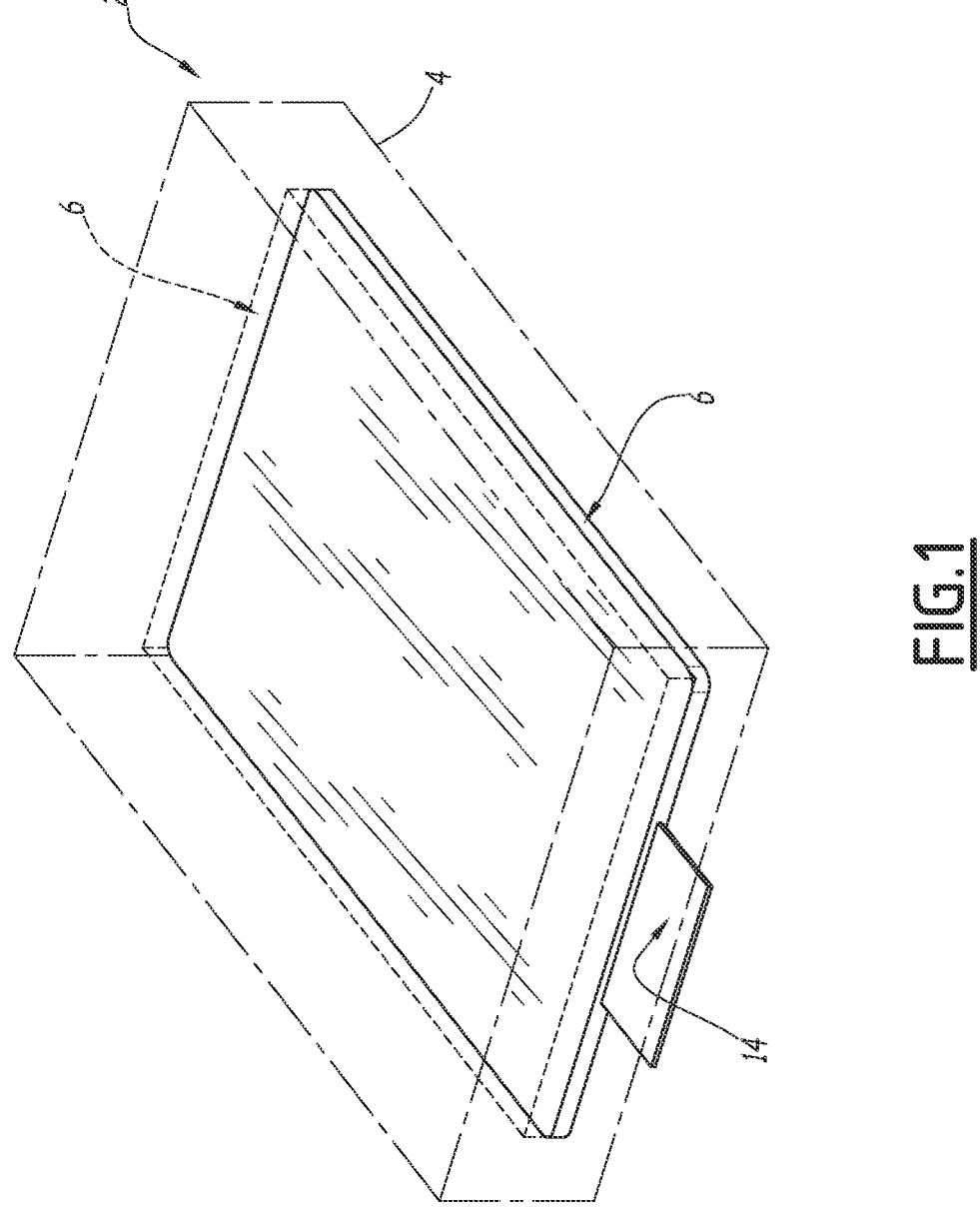
FIG. 1 shows a perspective view of a battery according to a first embodiment of the invention comprising a plurality of electrochemical cells.

FIG. 1 shows a battery according to the invention, designated by the general reference 2. Battery 2 is an electrochemical battery as commonly used in electric vehicles. However, other areas of application for the battery 2 can be envisaged, such as energy storage, electric mobility, aviation and rail.

The battery 2 comprises a housing 4 and at least two electrochemical cells 6, one of which is shown in solid lines and the other in dashed lines in FIG. 1. The battery 2 may of course comprise any number of electrochemical cells 6.

The electrochemical cells 6 are arranged in the housing 4 and are electrically connected to each other, in either a parallel or series electrical connection.

The housing 4 is, for example, a rectangular parallelepipedal housing made of metal or thermoplastic material. Alternatively, the housing has a cylindrical shape with a circular cross-section. The housing 4 has walls that are less deformable than the walls of the electrochemical cells (see below).

Figure 2:
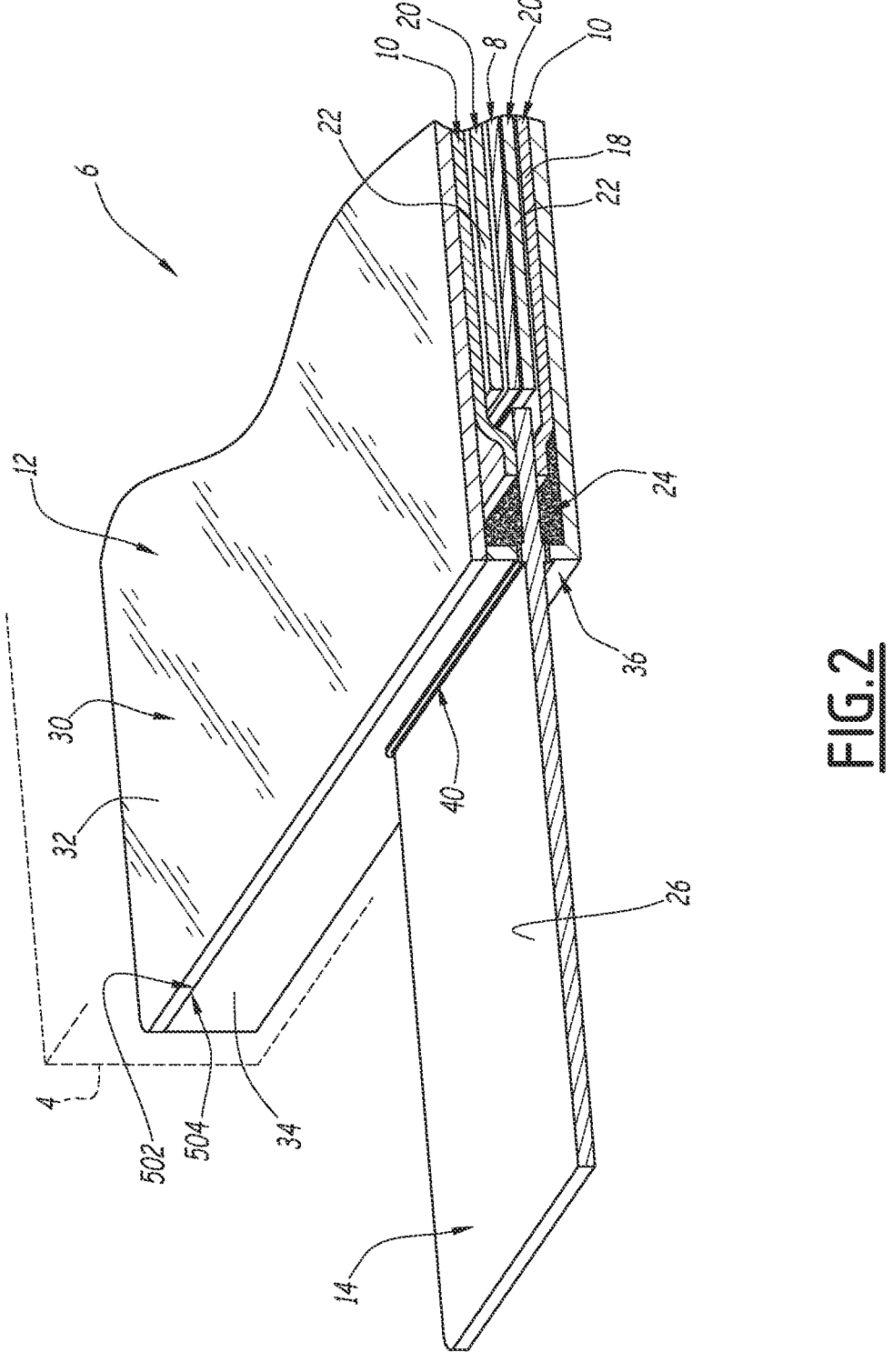
FIG. 2 shows a larger-scale perspective view and partial cross-section of a portion of the battery of FIG. 1, comprising an electrochemical cell according to the invention.

FIG. 2 shows the electrochemical cell 6 in perspective and at a larger scale, with part of the electrochemical cell omitted.

The electrochemical cell 6 comprises a first electrode 8 of a first polarity, a second electrode 10 of a second polarity, each having a current collector in the form of a metal strip coated over a portion with an active material, the uncoated portion being connected to a first terminal 12 of the first polarity and a second terminal 14 of the second polarity.

The first electrode 8 comprises a current collector formed from a metal strip, in this case substantially rectangular, for example made of aluminium, coated on both sides and on one portion with an active material. For example, in the case of a lithium secondary battery, the active material of the first electrode is a paste containing a metal oxide comprising lithium atoms, such as lithium cobalt dioxide ($LiCoO_2$, "LCO"), NMC ($LiNi_xMn_yCo_{1-x-y}O_2$), NCA ($LiNi_xCoyAl_{1-x-y}O_2$), SLFP ($LiFePO_4$), LMO ($LiMn_2O_4$) or similar layered compounds. The first electrode 8 is for example the positive electrode.

The second electrode 10 comprises two current collectors 18 formed of metal strips, in this case substantially rectangular, for example copper, coated with an active material on one portion. For example, in the case of a lithium secondary battery, the active material of the second electrode is a paste containing a carbonaceous material capable of inserting lithium atoms, such as graphite or amorphous nanocrystalline silicon, LTO ($Li_4Ti_5O_{12}$) or TNO ($TiNb_2O_7$). The second electrode 10 is for example the negative electrode.

The two metal strips coated with an active material forming the second electrode 10 are arranged on either side of the first electrode 8.

The electrochemical cell 6 comprises a separator 20, separating the first electrode 8 from the second electrode 10. In this case, the separator 20 comprises two separator sheets 22 which are arranged on both sides of the first electrode 8 between the first electrode 8 and the second electrode 10.

In the case of a Li-Ion electrochemical cell, the separator 20 is permeable to lithium ions, but electronically insulating. The separator 20 is, for example, made of a polyolefin membrane.

The electrochemical cell 6 also comprises an electrolyte 24, which may be liquid, such as a $LiPF_6$ lithium salt electrolyte, solid or gel, such as Polyvinylidene Fluoride (PVDF) polymers or a Polyvinylidene Fluoride-Hexafluoropropylene (PVDF-HFP) copolymer.

In this case, the second terminal 14 is a tab 26 attached to the two electrode strips 18 in a portion not coated with the active material of the second electrode 10. For example, the electrode strips 18 of the second electrode 10 are arranged on both sides of the tab 26. The second terminal 14 is thus, in this embodiment, fixed between the two electrode strips 18, by laser or ultrasonic welding.

The second terminal 14 is for example made of copper or nickel.

The electrochemical cell 6 comprises a casing 30 with a first wall 32 and a second wall 34. The first wall 32 and the second wall 34 are joined at their periphery or are integrally formed along one edge of the casing 30 and joined on the other three sides of their periphery. The first wall 32 and the second wall 34 are for example substantially rectangular in shape.

The casing 30 contains the first electrode 8, the second electrode 10, the separator 20 and the electrolyte 23.

In the present embodiment, the first electrode 8 is electrically connected to the casing 30, so that the casing 30 forms the first terminal 12. To make this connection, an uncoated portion of the first electrode 8 is welded to a part of the casing 30, to the wall 32 or to the wall 34 by a laser or ultrasonic welding process.

The casing 30 comprises or forms a passage opening 36 of the second terminal 14 and the second terminal 14 extends through this passage opening 36.

The electrochemical cell 6 is provided with means 40 for electrically insulating the second terminal 14 from the casing 30 and with means for sealing. These electrical insulation means 40 comprise an electrical insulating element 42 made of plastic extending between the second terminal and the casing and electrically insulating spacer elements 44 adapted to separate the second terminal from the casing when the plastic of the electrical insulating element 42 is in a liquid state. Preferably, the plastic electrical insulating element 42 comprises a portion on the second terminal 14 and a portion on the wall of the casing 30. During assembly, these two parts are heated to seal the casing. As a result, the sealing means are conflated with the electrical insulating element.

Figure 7:
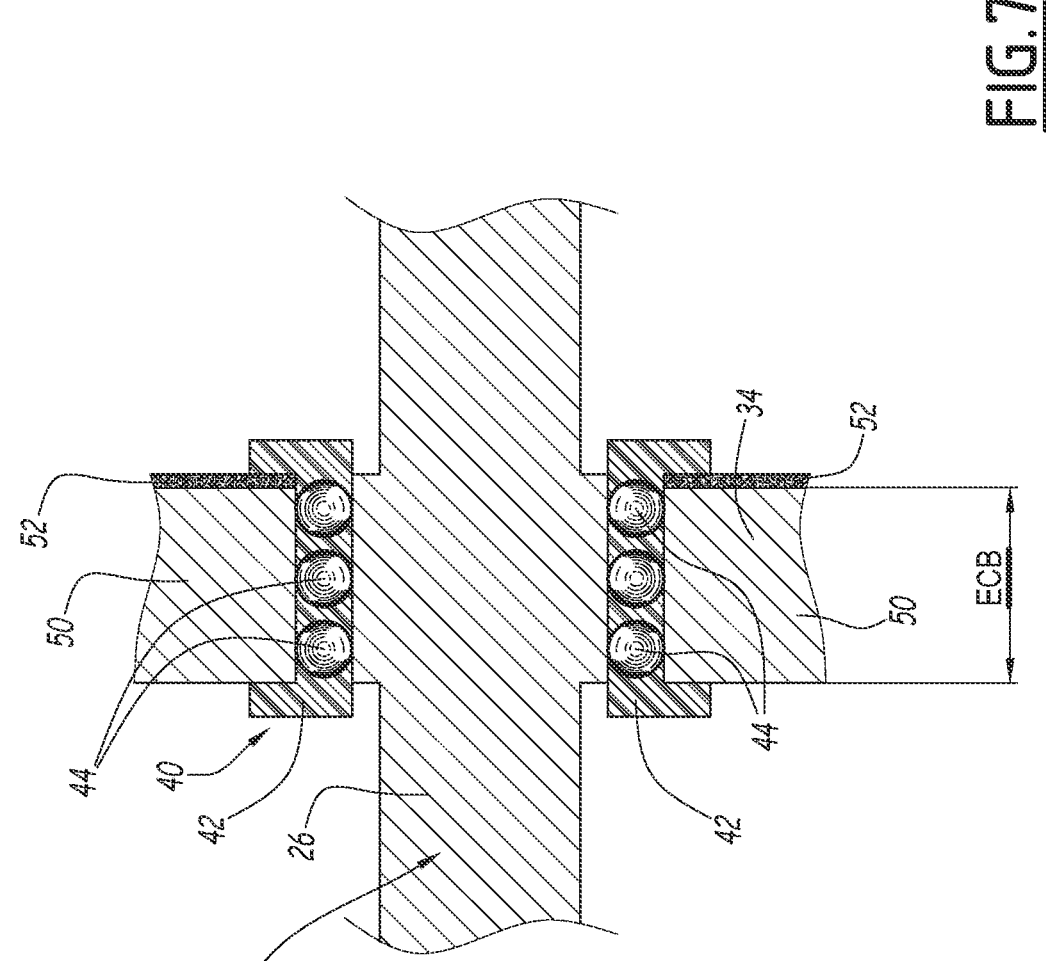
FIG. 7 shows an enlarged view of a portion of FIG. 2.

Referring to FIG. 7, the spacer elements 44 comprise or consist of microballs made of a material having a melting temperature above the melting temperature of the plastic. The microballs have, for example, a diameter between 50 μm and 500 μm, preferably between 100 μm and 200 μm. The microballs are embedded in the molten and solidified plastic of the electrical insulating element 42.

The micro-balls are preferably made of thermoplastic material, for example PET or PPS.

The first wall 32 and the second wall 34 each comprise a base body 50 and an electrically insulating layer 52 on their inner side (see FIG. 7).

The base bodies 50 are made of metal and can each be formed by a metal sheet. The base bodies 50 may have a thickness ECB of between 80 μm and 500 μm. In particular, this thickness can be between 120 μm and 460 μm, and especially between 180 μm and 460 μm. The base bodies 50 are for example made of aluminium, an aluminium-based alloy, steel, preferably stainless or nickel-plated steel.

The electrically insulating layer 52 may comprise or consist of either a plastic coating or a layer resulting from a surface treatment of the base body 50. The electrically insulating layer 52 may be formed by anodising the base body 50, and is in particular an aluminium oxide layer formed by anodising the base body 50. In the case where the electrically insulating layer comprises or consists of a plastic coating, the coating may be either a layer of a polymer deposited in liquid form and then solidified, or a layer of a polymer deposited in powder form by electrostatic deposition.

In case the electrically insulating layer 52 is a layer resulting from a surface treatment of the base body 50, it can be obtained by a ceramic-based surface treatment by plasma spraying.

Alternatively, or in addition to the electrically insulating layer 52, the electrochemical cell assembly consisting of the first electrode 8, the second electrode 10, the separator sheets and the electrolyte are embedded in an insulating matrix, for example formed from a thermoplastic casing with a thickness of between 20 μm and 100 μm.

The base body 50 of the first wall 32 comprises a base body edge 502 and the base body 50 of the second wall 34 comprises a base body edge 504.

Advantageously, the edges 502, 504 of the base bodies 50 are welded together by laser welding to form the casing 30. Thus, the edges of the base bodies 50 are joined by a weld bead 56 to form the casing 30. At the location of the weld bead 56, the base bodies 50 are free of the electrically insulating layer. The mechanical connection between the base bodies 50 is therefore achieved by the material solidarity of the walls, i.e. by a metal-to-metal connection.

The passage opening 36 here is an opening in either the first or second wall of the casing 30, namely in the second wall 34. The passage opening 36 is therefore formed entirely by the second wall 34.

Figure 3:
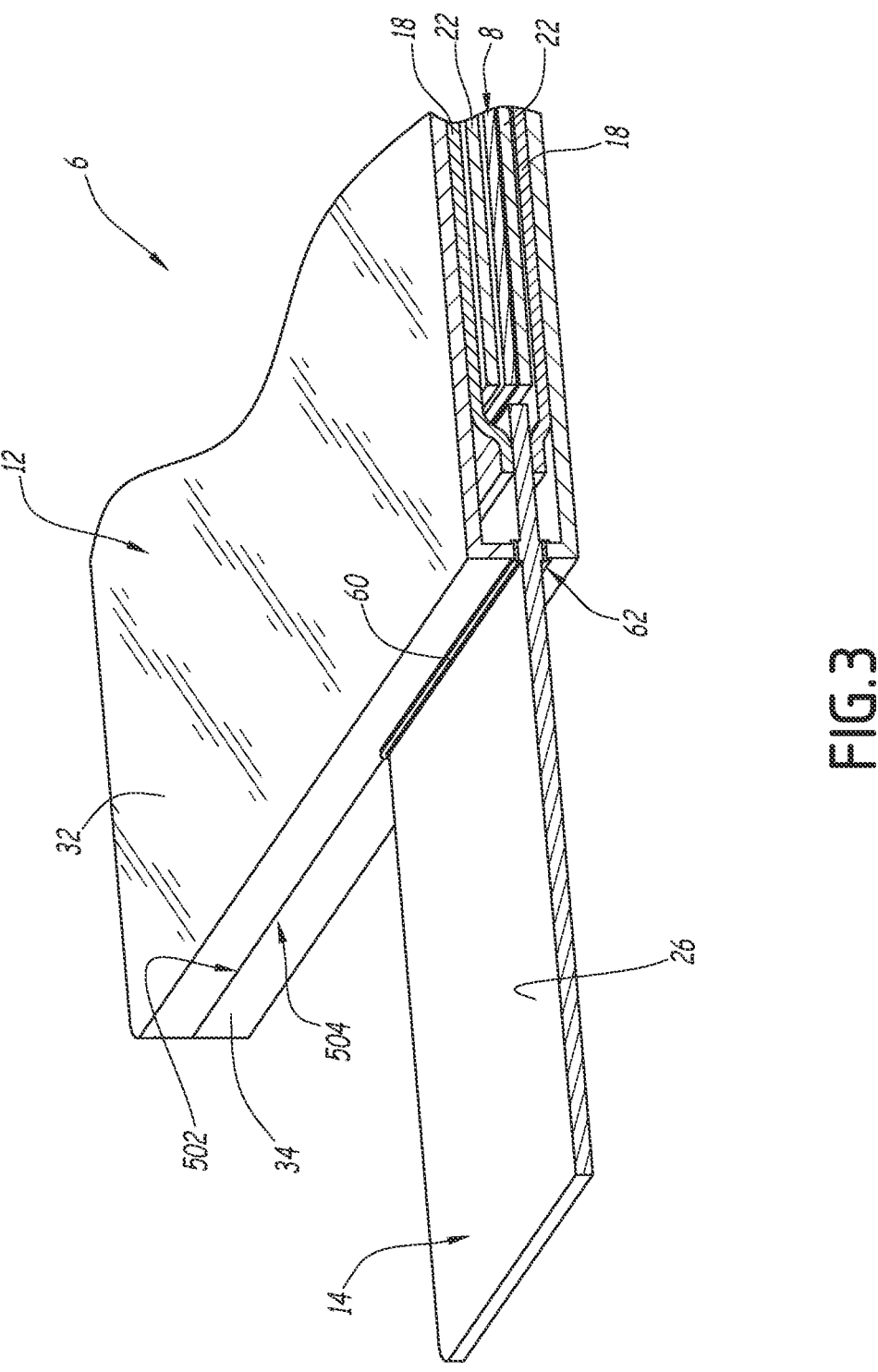
FIG. 3 shows a variant of the electrochemical cell of the battery of FIGS. 1 and 2 in a view similar to that of FIG. 2.

FIG. 3 shows a variant of the electrochemical cell 6 of the battery 2 of FIGS. 1 and 2. The view in FIG. 3 is similar to that in FIG. 2. In the following, only the differences from the previous embodiment will be described. Similar elements have the same references.

The passage opening 36 of the casing 30 is formed by two edges 60 and 62 of the first 32 and second 34 walls of the casing diverging locally.

The first wall 32 and second wall 34 are symmetrical about a plane of symmetry extending parallel to the general plane of the first electrode 8.

The edges 60, 62 of the first 32 and second 34 walls are connected to each other adjacent to the passage opening 36 on both sides, but are locally spaced apart to form the passage opening 36. Generally speaking, the edges 60, 62 of the first 32 and second 34 walls are connected to each other along their entire length except at the passage opening 36.

This variant is easy to manufacture as it does not require an opening in one of the walls.

Figure 4:
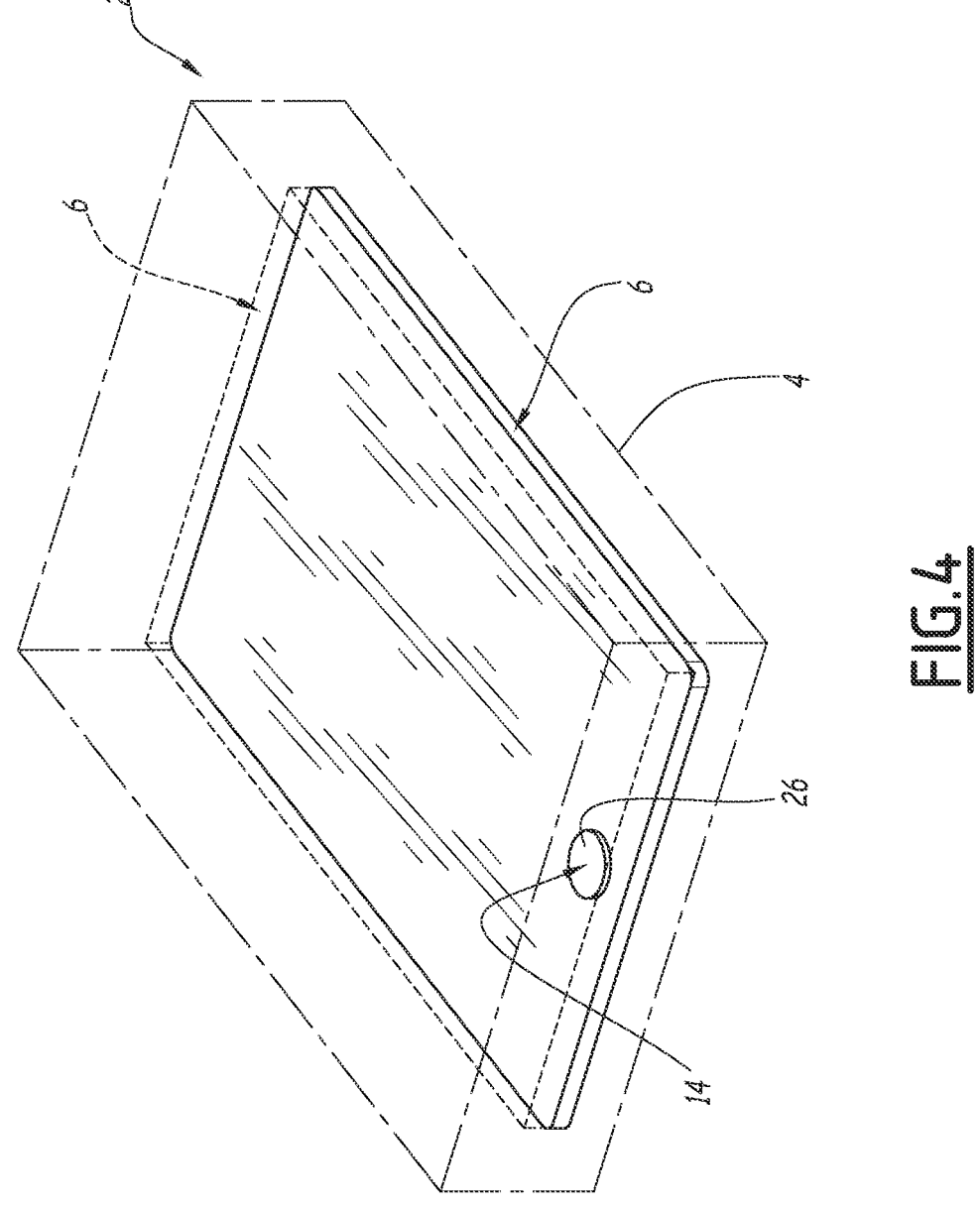
FIG. 4 shows a perspective view of a battery according to a second embodiment of the invention comprising a plurality of electrochemical cells.
Figure 5:
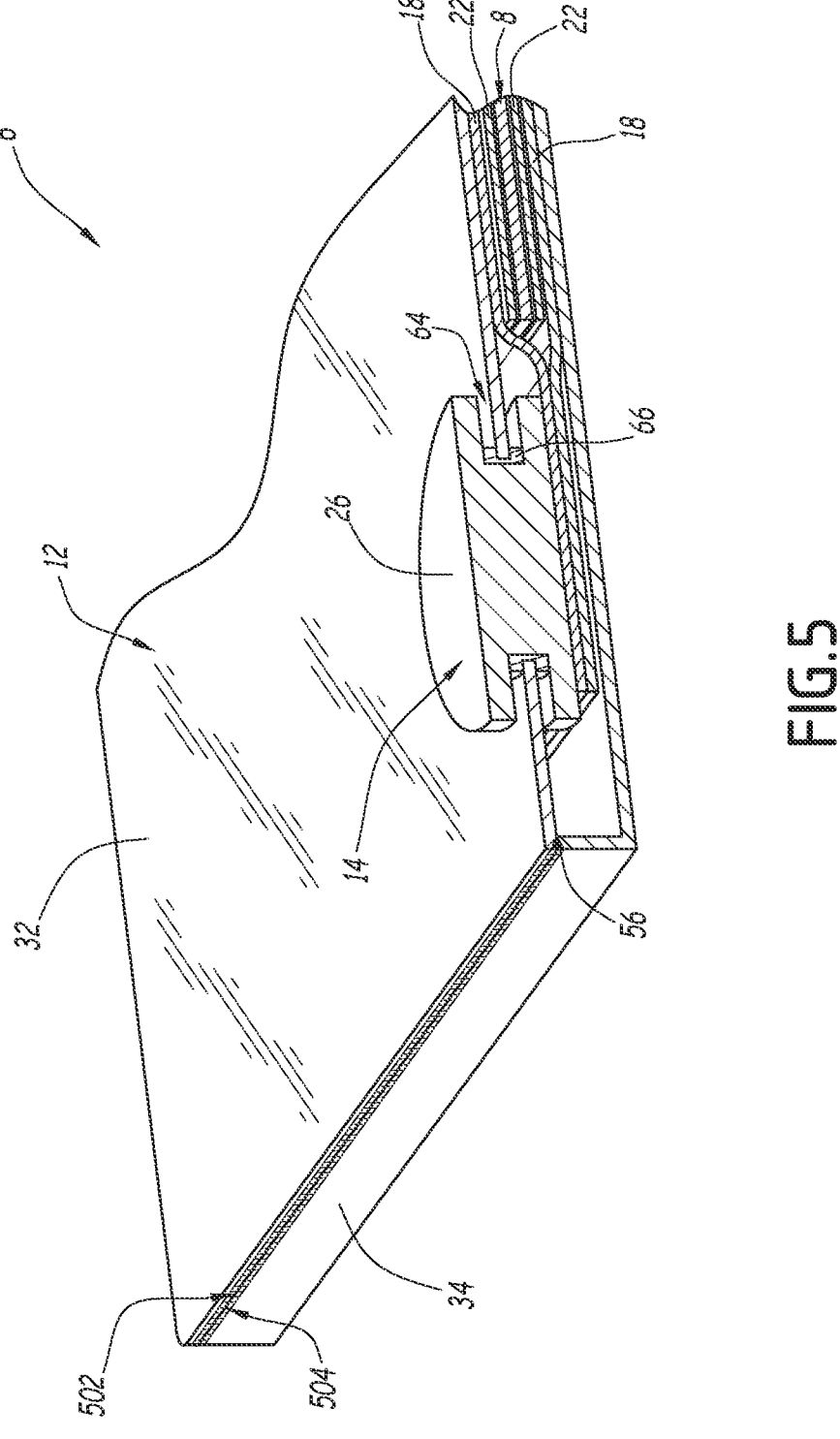
FIG. 5 shows a larger-scale perspective view and partial cross-section of a portion of the battery of FIG. 4, comprising an electrochemical cell according to the invention.

FIG. 4 shows a perspective view of a battery 2 according to a second embodiment of the invention comprising a plurality of electrochemical cells 6. FIG. 5 shows a larger-scale perspective and partial cross-section of an electrochemical cell from the battery in FIG. 4.

The view in FIG. 4 is similar to the one in FIG. 1 and the view in FIG. 5 is similar to the one in FIG. 2. In the following, only the differences from the previous embodiment will be described. Similar elements have the same references.

The second terminal 14 is attached to one of the two electrode sheets 18 and the other of the two electrode sheets 18 is attached to one of the two electrode sheets. In other words, the two electrode sheets 18 are attached to each other and the two electrode sheets 18 are on the same side of the second terminal 14.

Also, the second terminal 14 is not a tab, but is a button 26, in this case a washer.

The passage opening 36 is provided in the first wall 32 of the casing 30. The passage opening 36 is for example circular in shape.

The button 26 passes through only one of either the first 32 or second 34 wall of the casing 30 and thus through the passage opening 36. In this case the button extends through the first wall 32.

In addition, the passage opening 36 extends along a side face of the casing 30, which is a large face of the casing.

After assembly, the button 26 comprises a circumferential groove 64, and the casing 30 extends into the circumferential groove 64. More specifically, the first wall 32 extends into the circumferential groove 64. The button 26 is made of metal, for example, and is obtained by plastic deformation, for example by crimping or by assembling several parts by laser or friction.

These electrical insulation means 40 comprise one or more electrical insulating elements circular in shape 66 equipped with an electrical insulating element 42 made of plastic extending between the second terminal 14 and the casing 30 and electrically insulating spacer elements 44 adapted to separate the second terminal from the casing when the plastic of the electrical insulating element 42 is in a liquid state. The electrical insulating element 42 may be of a material as previously described. The spacer elements 44 may be microballs as previously described.

Figure 6:
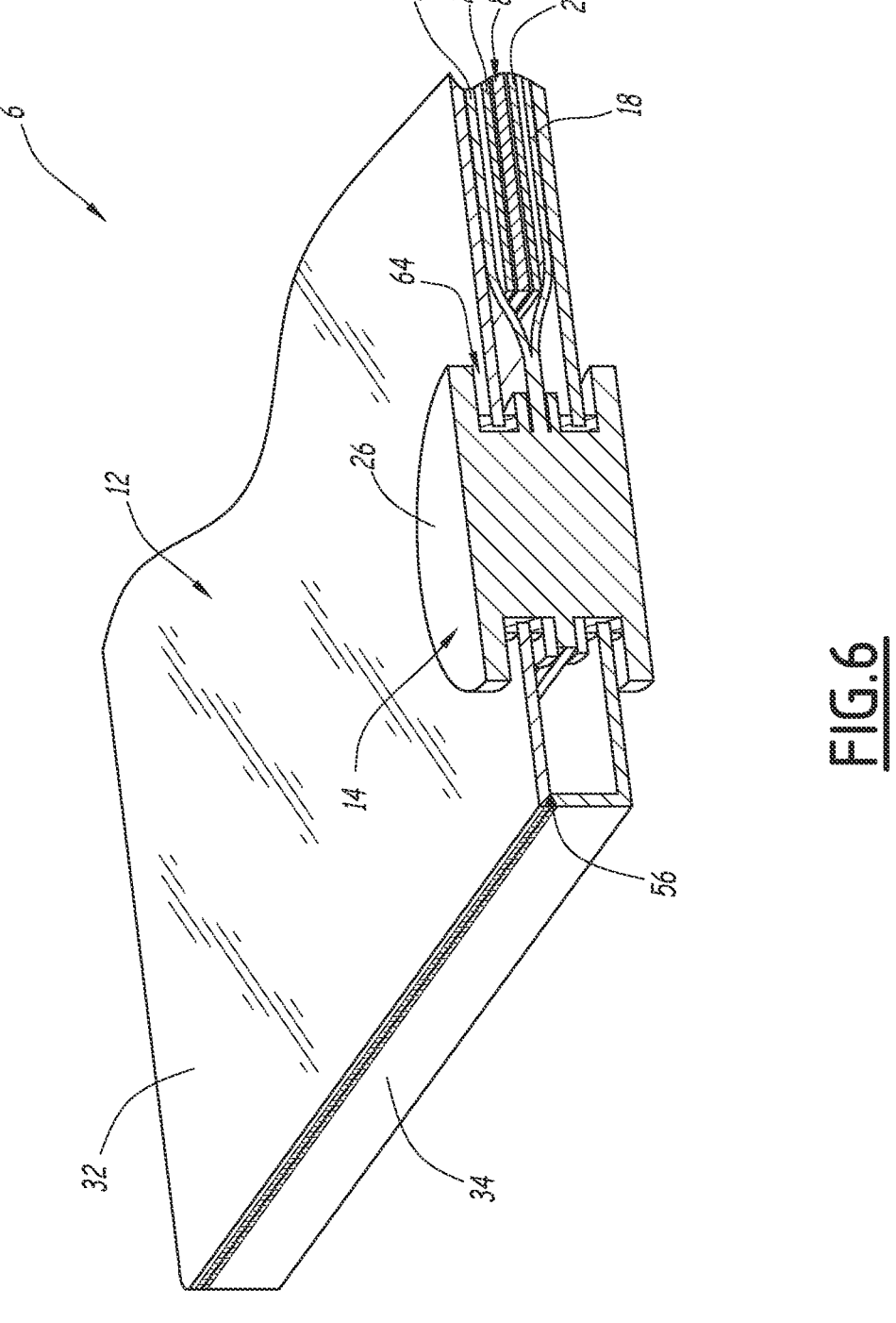
FIG. 6 shows a variant of the electrochemical cell of the battery of FIGS. 4 and 5 in a view similar to that of FIG. 5.

FIG. 6 shows a variant of the electrochemical cell 6 of the battery 2 of FIGS. 4 and 5. The view in FIG. 6 is similar to that in FIG. 5. In the following, only the differences from the previous embodiment will be described. Similar elements have the same references.

The second terminal 14, in the form of a button 26, is attached to the two electrode sheets 18, which are also pressed together at the second terminal 14.

The passage opening 36 is formed in the first wall 32 of the casing 30 and in the second wall 34 of the casing 30. The second terminal 14 thus extends through both the first 32 and second 34 walls of the casing.

In addition, the passage opening 36 in the first wall 32 of the casing 30 and in the second wall 34 of the casing each extend over a side face of the casing 30. The two passage openings 36 are aligned and face each other.

The electrochemical cells according to the invention are easy to manufacture and have a high reliability due to the described components.

In particular, the electrical insulation means 44 ensure an electrical insulation distance between the two polarities. In addition, the walls 32, 34 represent a good compromise between rigidity and resource expenditure by being relatively rigid, but not very thick. The terminals 14 lead to reliable electrical contact and easy assembly of the battery.

Furthermore, the location of the current output terminals in the footprint of the electrochemical cell allows the energy density of the cell to be optimised.

The way the walls 32 and 34 are connected by laser welding in particular makes it possible to achieve an electrical connection with low electrical resistance, a high degree of tightness and stability over time, and a good mechanical connection. In this respect, the metal casing according to the invention is an advantageous alternative to the pouch-type casings with a multi-layer structure currently used, which can only be joined by heat welding.

In a variant not shown, the portion of the first electrode 8 not coated with active material defines or is connected to the first terminal 12 of the first polarity. In this case, the casing 30, in particular the first 32 and second 34 walls, do not form the first terminal 12, but the first terminal is a separate element from the casing 30. In this case, the first terminal 12 may be a tab or button or other element electrically connected to the first electrode 8 in a manner similar to the second terminal 14 described above.

In this case, the casing 30 comprises or forms an additional passage opening of the first terminal 12 and the first terminal 12 extends through this additional passage opening. The additional passage opening may be formed in the same or similar manner to the above passage opening 36.

The interface between the casing 30, respectively the additional passage opening, and the first terminal 12 is designed in a similar manner to the interface between the casing 30 and the second terminal 14 and may comprise electrical insulation means identical to the electrical insulation means 40.

Generally, the second terminal 14 is attached to one of the two electrode sheets 18 and the other of the two electrode sheets 18 is attached to one of the two electrode sheets. In other words, the two electrode sheets 18 are attached to each other and the two electrode sheets 18 are on the same side of the second terminal 14. This feature is therefore not limited to the embodiment of FIGS. 4 and 5.

The invention claimed is:

1. An electrochemical cell for a battery, comprising
a first electrode of a first polarity,
a first terminal of the first polarity, a second electrode of a second polarity,
a second terminal of the second polarity,
a casing comprising:
    a first wall and a second wall, wherein the first wall and the second wall each comprise a base body made of metal and an electrically insulating layer comprising a plastic coating or a layer resulting from surface treatment, each of the base bodies comprises a base body edge, the edges of the base bodies connected by a weld bead to form the casing, and at the location of the weld bead, the base bodies are free of the electrically insulating layer;
    at least one opening for a passage of the first or second terminal, the first or second terminal extending through the opening; and
    an electrical insulation electrically insulating the first or second terminal from the casing, the electrical insulation comprising:
        a plastic electrical insulation element extending between the first or second terminal and the casing, the plastic electrical insulation made of plastic material, and
        electrically insulating spacer elements separating the first or second terminal from the casing when the plastic electrical insulation element is in a liquid state, wherein the spacer elements comprise microballs of a material having a melting temperature above the melting temperature of the plastic material and the microballs having a diameter between 100 μm and 200 μm, wherein the microballs are embedded in the plastic electrical insulation element made of solidified molten plastic material,
wherein the first or second terminal is a tab and the opening of the casing is formed by two edges of the first and second walls of the casing spaced apart from each other.

2. The electrochemical cell for a battery according to claim 1, wherein the metal base bodies are made of aluminium, an aluminium-based alloy, steel, stainless or nickel-plated steel.

3. The electrochemical cell for a battery, according to claim 1, wherein the base bodies have a thickness between 80 μm and 500 μm, or a thickness between 120 μm and 460 μm, or a thickness between 180 μm and 460 μm.

4. The electrochemical cell for a battery according to claim 1, wherein the second electrode comprises two electrode sheets and wherein either the second terminal is attached between the two electrode sheets or the second terminal is attached to one of the two electrode sheets and the other of the two electrode sheets is attached to one of the two electrode sheets.

5. A battery comprising a housing and at least two electrochemical cells, wherein the electrochemical cells are each an electrochemical cell according to claim 1, and wherein the electrochemical cells are arranged in the housing.

* * * * *